Jan. 4, 1966  M. L. LUTHER ETAL  3,226,922
SIDE-DELIVERY RAKES
Filed Jan. 2, 1963

INVENTORS:
MARTIN L. LUTHER
LYLE H. JACOBSON

By: Munson H. Lane
Att'y.

United States Patent Office 3,226,922
Patented Jan. 4, 1966

3,226,922
SIDE-DELIVERY RAKES
Martin L. Luther and Lyle H. Jacobson, Minneapolis, Minn., assignors to Patent & Development, Incorporated, Raleigh, N.C.
Filed Jan. 2, 1963, Ser. No. 249,080
8 Claims. (Cl. 56—400)

This invention relates to new and useful improvements in side-delivery rakes, and in particular, to improvements in side-delivery raking wheels.

Raking wheels of this type usually comprise a wheel member rotatably mounted upon a suitable axle and provided at the periphery thereof with a plurality of circumferentially spaced raking teeth. Usually, the raking teeth are in the form of wire prongs, rigidly secured to the wheel member, but having sufficient resilient flexibility so that they may flex under load and spring back to their initial form during the course of operation of the rake. To enhance their resilient flexibility, the wire prongs or teeth are often formed with a coil intermediate their ends, but the coiled arrangement not only involves a costly step in the manufacturing procedure of each tooth, but also a situation of unbalance in the raking ability of the entire wheel, when all of the teeth thereon are not coiled in a uniform manner. Moreover, even with the coil to enhance the resiliency of each tooth, a considerable amount of working stresses and strains is concentrated at the point of attachment of the tooth to the periphery of the raking wheel member, with the result that the conventional teeth often bend and even break off from the wheel.

Some effort has been made in the past to overcome these problems and difficulties, by mounting the raking teeth or prongs in resiliently flexible bases, capable of providing the flexing characteristics of the teeth without relying altogether on the inherent resiliency of the teeth themselves. However, such efforts have been limited to raking teeth carried by tubular rake bars rather than by rotatable wheel members, and no apparent advancement in the art has been made in resiliently flexible mounting of raking teeth or prongs on rotatable wheel members as such. In this regard it may be noted that the mounting of raking teeth on rotatable wheels presents different problems than the mounting of such teeth on tubular supporting bars, since teeth on rotatable wheels are subjected to rotary stressing forces which are greater than those encountered with tubular bars.

It is, therefore, the principal object of the invention to provide an improved side-delivery raking wheel with resiliently flexible mounting of raking teeth or prongs on the periphery of the wheel, the improved arrangement being such that the use of coiled teeth or prongs is not necessary; that twisting or breaking of teeth at the periphery of the wheel is prevented; that the teeth or prongs are free to flex under the working loads and stresses incident to rotatable raking wheels; and that the wheel itself provides a firm and a well balanced support for the resiliently flexible mount of each raking tooth.

Other advantages of the invention reside in its simplicity of construction, efficient and dependable operation, and in its adaptability to convenient and economical manufacture.

With the foregoing more important object and features in view and such other objects and features as may become apparent as this specification proceeds, the invention will be understood from the following description taken in conjunction with the accompanying drawings, wherein like characters of reference are used to designate like parts, and wherein.

Figure 1:
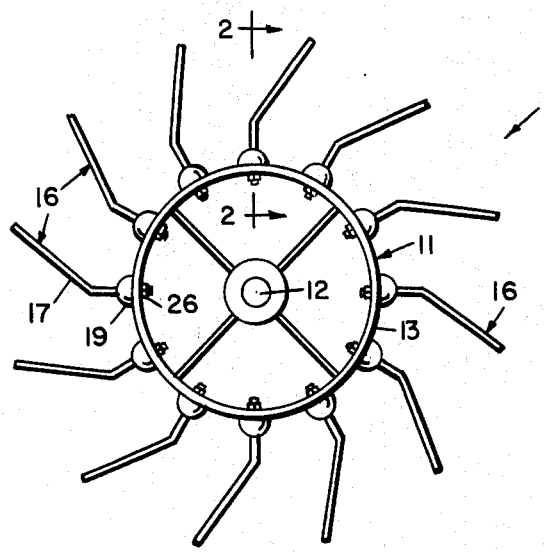
FIGURE 1 is a side elevational view of a raking wheel in accordance with the invention.
Figure 3:
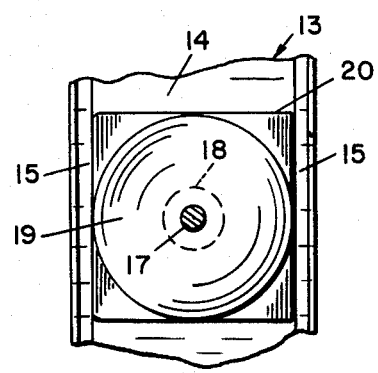
FIGURE 3 is a sectional view, taken substantially in the plane of the line 3—3 in FIGURE 2.
Figure 2:
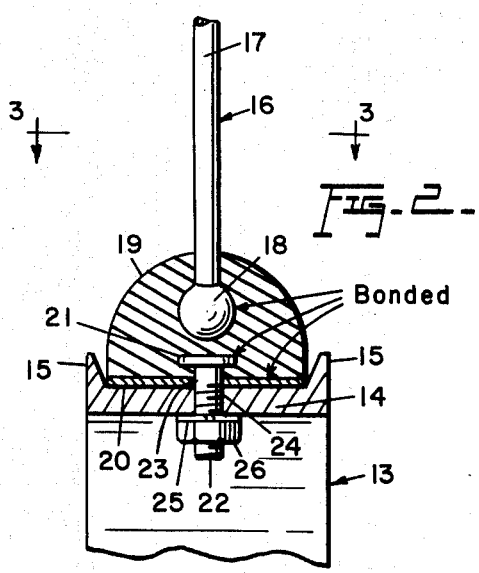
FIGURE 2 is an enlarged sectional detail, taken substantially in the plane of the line 2—2 in FIGURE 1.

Referring now to the accompanying drawings in detail, the reference numeral 10 generally designates a side-delivery raking wheel, including a wheel member 11 rotatably mounted upon a suitable shaft or axle 12.

The wheel member 11 has a drop-center rim 13, including a drop-center portion 14 and a pair of side flanges 15. A plurality of raking teeth 16 are secured at circumferentially spaced points to the wheel rim 13, the invention being primarily concerned with the particular mounting of these teeth on the rim.

Each of the teeth 16 comprises a wire stem or prong 17, which may be angulated intermediate its ends so that it is disposed in proper operative relation to the plane of rotation of the wheel. The inner end of the prong 17 is formed integrally with a bulbous securing element 18, which is embedded in a substantially hemi-spherical mounting base 19.

The base 19 has a flat bottom surface which is bonded to a rectangular base plate 20, and also embedded in the base 19 is an enlarged head 21 of a fastening element in the form of a bolt 22 which projects through an aperture 23 formed in the plate 20. The securing element 18 and the bolt head 21 as well as the base plate 20 are chemically or otherwise bonded to the base 19 which is formed from resiliently flexible material such as rubber, neoprene, or the like.

The bolt 22 passes through an aperture 24 formed in the drop-center portion 14 of the wheel member and is equipped with a lockwasher 25 and a nut 26. The width of the plate 20 is such that when it is seated on the drop-center portion 14 upon tightening of the nut 26, the straight opposite side edges of the plate 20 are engaged by the side flanges 15 of the wheel member, whereby the plate is prevented from turning or twisting about the axis of the bolt 22. This not only facilitates tightening of the nut 26, but also assures that the raking teeth 16 are properly oriented relative to the wheel member.

By virtue of the resiliently flexible bases 19, the prongs 17 of the raking teeth are free to flex under working loads and stresses when the raking wheel is in operation, yet are firmly secured to the wheel rim. The bolt 22 of each tooth unit is coaxial with the inner end portion of the associated prong 17 and the bolt head 21 is spaced from the prong element 18 only sufficiently for a small section of the material of the base 19 to intervene, while substantial masses of the base material completely surround the bolt head 21, the element 18 and the adjacent end portion of the prong 17 to provide effective control and prevent excessive oscillation of the prong.

When the prong of any raking tooth becomes broken or otherwise damaged, the tooth may be quickly and easily replaced by simply unscrewing the nut 26 from the bolt 22 and withdrawing the bolt from the wheel aperture 24.

While in the foregoing there has been described and shown the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed.

What is claimed as new is:

1. In a side-delivery raking wheel, the combination of a wheel member having a drop-center rim, said rim including a drop-center portion and a flange at least at one side of said drop-center portion, and at least one rake tooth assembly carried by said wheel member, said rake tooth assembly comprising a rake tooth including a prong, a resilient mounting base securing said prong, and a mounting plate bonded to said base, said mounting plate being secured to said drop-center portion of said rim and having a straight side edge in abutment with said flange, whereby to prevent turning of the mounting plate on the rim.

2. In a side-delivery raking wheel, the combination of a wheel member having a drop-center rim including a drop-center portion and a pair of parallel flanges at the opposite sides thereof, and a plurality of circumferentially spaced raking tooth assemblies carried by said wheel member, each of said raking tooth assemblies comprising a rake tooth including a prong, a resilient mounting base securing said prong, a mounting plate bonded to said base, and fastener means securing said plate to said drop-center portion of said rim, said mounting plate having straight side edges in abutment with said flanges, whereby to prevent turning of the mounting plate on the rim about said fastener means.

3. The device as defined in claim 2 wherein said rake tooth also includes a bulbous securing element provided on said prong and embedded in said resilient mounting base.

4. The device as defined in claim 2 wherein said fastener means include a fastening element having an enlarged head embedded in said resilient mounting base.

5. In a side-delivery raking wheel, the combination of a wheel member having a drop-center rim including a drop-center portion and a flange at one side thereof, and a raking tooth assembly carried by said wheel member, said raking tooth assembly comprising a rake tooth including a prong angulated in a predetermined angular relation to and projecting outwardly from said wheel member, a resilient mounting base securing the inner end of said prong, a mounting plate bonded to said base, and a fastening element securing said plate to said drop-center portion of said rim, said mounting plate having a straight side edge in abutment with said flange, whereby to prevent the mounting plate from turning about said fastening element and retain said prong in its predetermined angular relation to said wheel member.

6. The device as defined in claim 5 wherein said fastening element comprises a screw-threaded stud secured in said resilient mounting base and projecting through aligned apertures formed in said mounting plate and in said drop-center portion of said rim, and a nut provided on said stud, the abutment of said straight side edge of the mounting plate with said flange preventing said stud from turning when said nut is being tightened or loosened.

7. A rake tooth assembly for use on a side-delivery raking wheel having a drop-center rim with a flange at one side thereof, said rake tooth assembly comprising in combination, a rigid mounting plate adapted to be positioned on a drop-center rim and having a straight side edge for abutment with the rim flange whereby to prevent the mounting plate from turning on the rim, a resilient mounting base bonded to said mounting plate, a rake tooth including an angulated prong secured to and projecting outwardly from said mounting base, and a fastening element embedded in said mounting base and projecting through said mounting plate in alignment with said prong.

8. The device as defined in claim 7 wherein said rake tooth also includes a bulbous securing element provided on said prong and embedded in said resilient mounting base.

References Cited by the Examiner
UNITED STATES PATENTS

| | | | |
|---|---|---|---|
| 1,649,678 | 11/1927 | Freivogel | 301—5 |
| 2,712,723 | 7/1955 | Ryan | 56—377 |
| 3,019,586 | 2/1962 | Gustafson | 56—400 |
| 3,065,591 | 11/1962 | Gustafson | 56—400 |

ABRAHAM G. STONE, *Primary Examiner.*

RUSSELL R. KINSEY, ANTONIO F. GUIDA,
*Examiners.*